United States Patent
Jo et al.

(10) Patent No.: US 9,697,415 B2
(45) Date of Patent: Jul. 4, 2017

(54) RECORDING MEDIUM, IMAGE PROCESSING METHOD, AND INFORMATION TERMINAL

(71) Applicant: FUJITSU LIMITED, Kawasaki-shi, Kanagawa (JP)

(72) Inventors: Yuka Jo, Kawasaki (JP); Soichi Hama, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/885,004

(22) Filed: Oct. 16, 2015

(65) Prior Publication Data

US 2016/0034747 A1 Feb. 4, 2016

Related U.S. Application Data

(63) Continuation of application No. PCT/JP2013/062431, filed on Apr. 26, 2013.

(51) Int. Cl.
| | |
|---|---|
| *G06K 9/00* | (2006.01) |
| *G06T 3/40* | (2006.01) |
| *G06F 21/32* | (2013.01) |
| *G06F 3/01* | (2006.01) |
| *G06F 3/03* | (2006.01) |

(Continued)

(52) U.S. Cl.
CPC ......... *G06K 9/00255* (2013.01); *G06F 3/005* (2013.01); *G06F 3/012* (2013.01); *G06F 3/017* (2013.01); *G06F 3/0304* (2013.01); *G06F 21/32* (2013.01); *G06K 9/00006* (2013.01); *G06K 9/00885* (2013.01); *G06T 3/40* (2013.01); *G06T 7/73* (2017.01); *G06F 2203/04806* (2013.01); *G06T 2207/10024* (2013.01); *G06T 2207/30201* (2013.01)

(58) Field of Classification Search
None
See application file for complete search history.

(56) References Cited

U.S. PATENT DOCUMENTS

| | | |
|---|---|---|
| 2004/0242988 A1 | 12/2004 | Niwa et al. |
| 2006/0044399 A1 | 3/2006 | Fredlund et al. |
| 2008/0031495 A1 | 2/2008 | Saijo et al. |

(Continued)

FOREIGN PATENT DOCUMENTS

| | | |
|---|---|---|
| EP | 2216678 A1 | 8/2010 |
| JP | 2004-258714 | 9/2004 |

(Continued)

OTHER PUBLICATIONS

International Search Report, mailed in connection with PCT/JP2013/062431 and mailed Jun. 4, 2013.

(Continued)

*Primary Examiner* — Delomia L Gilliard
(74) *Attorney, Agent, or Firm* — Fujitsu Patent Center

(57) ABSTRACT

An information terminal includes acquiring an image of a first subject that is captured by a first sensor provided on a back surface of a surface on which a screen of the information terminal is disposed, and when displaying the image on the screen, changing a degree of scaling up/down of the image and a position at which the image is displayed in accordance with a position of a second subject that is imaged by a second sensor provided to the information terminal.

12 Claims, 10 Drawing Sheets

(51) Int. Cl.
*G06F 3/00* (2006.01)
*G06T 7/73* (2017.01)

(56) References Cited

U.S. PATENT DOCUMENTS

| | | |
|---|---|---|
| 2008/0063244 A1 | 3/2008 | Tanaka et al. |
| 2009/0136223 A1 | 5/2009 | Motomura et al. |
| 2009/0150775 A1 | 6/2009 | Miyazaki et al. |
| 2013/0033485 A1 | 2/2013 | Kollin et al. |
| 2013/0083214 A1 | 4/2013 | Nakata |
| 2014/0192244 A1* | 7/2014 | Ishihara ............. H04N 5/23245 348/333.02 |
| 2014/0340557 A1 | 11/2014 | Ishihara et al. |
| 2015/0181110 A1 | 6/2015 | Ishihara et al. |
| 2015/0229836 A1 | 8/2015 | Ishihara et al. |

FOREIGN PATENT DOCUMENTS

| | | |
|---|---|---|
| JP | 2006-141589 | 6/2006 |
| JP | 2007-052534 | 3/2007 |
| JP | 2008-040827 | 2/2008 |
| JP | 2008-071030 | 3/2008 |
| JP | 2008-160703 A | 7/2008 |
| JP | 2009-157908 | 7/2009 |
| JP | 2010-541046 | 12/2010 |
| JP | 2011-066699 | 3/2011 |
| JP | 2012-054886 | 3/2012 |
| JP | 2013-077678 | 4/2013 |
| JP | 2013077678 A * | 4/2013 |
| WO | 2009042392 | 4/2009 |
| WO | 2013051259 | 4/2013 |

OTHER PUBLICATIONS

Extended European Search Report dated Mar. 17, 2016 for corresponding European Patent Application No. 13882966.8, 8 pages.
Korean Office Action mailed Jul. 19, 2016 for corresponding Korean Patent Application No. 10-2015-7030235, with English Translation, 8 pages.
Japanese Office Action mailed Aug. 2, 2016 for corresponding Japanese Patent Application No. 2015-513466, with Partial English Translation, 22 pages.

* cited by examiner

RECORDING MEDIUM, IMAGE PROCESSING METHOD, AND INFORMATION TERMINAL

CROSS-REFERENCE TO RELATED APPLICATION

This application is a continuation application of International Application PCT/JP2013/062431 filed on Apr. 26, 2013 and designating the U.S., the entire contents of which are incorporated herein by reference.

FIELD

The present invention relates to an image processing program, an image processing method, and an information terminal.

BACKGROUND

With increasing awareness of information security, biometrics are being introduced for authentication for unlocking of and login in personal information terminals, such as smartphones, slate terminals, and tablet terminals.

When a living body is imaged with an information terminal, if the position or posture of a part of the living body that is a subject is not proper, a disadvantage that it would not be possible to correctly extract biological information used for authentication or the extracted amount of characteristics would not match the registered amount of characteristics may occur. In such a case, the time for authentication extends and furthermore the accuracy of authentication lowers.

As an exemplary technology to deal with the problem, there is a technology for displaying an operation instruction for positioning and guiding a part of a living body such that the operation instruction is superimposed onto an image of the living body that is acquired by a sensor.

Patent Document 1: Japanese National Publication of International Patent Application No. 2010-541046

Patent Document 2: Japanese Laid-open Patent Publication No. 2007-052534

Patent Document 3: Japanese Laid-open Patent Publication No. 2009-157908

Patent Document 4: Japanese Laid-open Patent Publication No. 2004-258714

Patent Document 5: Japanese Laid-open Patent Publication No. 2008-071030

The above-described technology, however, has a limit to improvement of accuracy of authentication as described below.

For example, from among information terminals, such as smartphones, slate terminals, and tablet terminals, there are terminals in each of which a sensor that images a living body is disposed on the back surface, i.e., on the back of the screen. When such an information terminal images a living body, because it is not possible for a user to directly view the position of the sensor, it is more difficult to dispose a part of the living body in an appropriate location. In each of the above-described technologies, however, an operation instruction for positioning or guiding the part of the living body is only issued on an assumption that the sensor is set in a position that the user can directly view and thus it is not possible to apply such positioning and guiding to a case where the sensor is on the back surface. For this reason, it is not possible, with the above-described technologies, to solve the disadvantage that biological information used for authentication is not necessarily extracted or the amount of extracted characteristics does not necessarily match the registered amount of characteristics, which may lower the accuracy of authentication.

SUMMARY

According to an aspect of the embodiment of the invention, a non-transitory computer readable recording medium stores therein an image processing program that causes an information terminal to execute a process including: acquiring an image of a first subject that is captured by a first sensor provided on a back surface of a surface on which a screen of the information terminal is disposed; and when displaying the image on the screen, changing a degree of scaling up/down of the image and a position at which the image is displayed in accordance with a position of a second subject that is imaged by a second sensor provided to the information terminal.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

The image processing program, the image processing method, and the information terminal according to the present application will be described below with reference to the accompanying drawings. The embodiments do not limit the disclosed technology. Each embodiment can be combined as appropriate within a range in which there is no contradiction between the contents of processing.

First Embodiment

[Configuration of Information Terminal]

Figure 1:
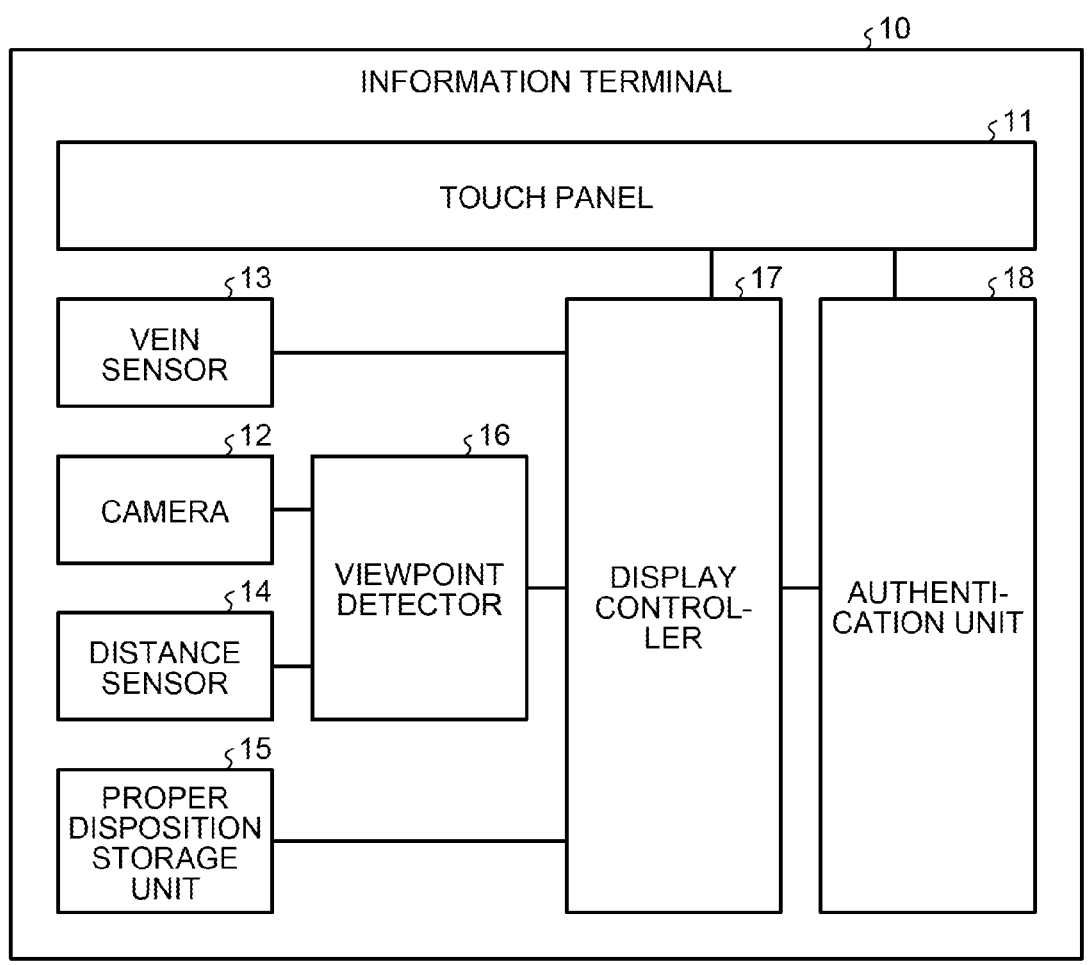
FIG. 1 is a block diagram illustrating a functional configuration of an information terminal according to a first embodiment.

First, a functional configuration of an information terminal according to an embodiment will be described. FIG. 1 is a block diagram illustrating a functional configuration of an information terminal according to a first embodiment. The information terminal 10 represented in FIG. 1 is a terminal device that performs information processing. For the example illustrated in FIG. 1, the following descriptions will be given with an assumption that palm vein authentication is employed for authentication for unlocking of the screen of the information terminal 10, i.e., the screen, or login.

When causing a vein sensor 13 that is disposed on the back of the screen to image the palm, the information terminal 10 displays the image captured by the vein sensor 13 as the sight for positioning the palm on the screen. As part of such positioning, the information terminal 10 performs image processing for changing the position and size of the image displayed on the screen in accordance with the position of an organ of the face, e.g., the position of an eye, in the image captured by a camera 12 provided on the side of the screen. The palm is covered by a mode of a first subject. The face is covered by a second subject.

According to a mode, the information terminal 10 can be implemented by installing an image processing program that is provided as package software or online software in a desired computer. For example, the image processing program is installed in, not only mobile communication terminals, such as smartphones, mobile phones, or personal handyphone systems (PHS), but also tablet terminals and slate terminals including personal digital assistants (PDA) not connecting to a mobile communication network. Accordingly, the tablet terminals and slate terminals can function as the information terminal 10. Tablet terminals and slate terminals are exemplified here as an example by which the information terminal 10 is implemented. Alternatively, the image processing program may be installed in a fixed terminal, such as a personal computer.

As illustrated in FIG. 1, the information terminal 10 includes a touch panel 11, the camera 12, the vein sensor 13, a distance sensor 14, a proper disposition storage unit 15, a viewpoint detector 16, a display controller 17, and an authentication unit 18. The information terminal 10 may include, in addition to the function units represented in FIG. 1, various function units that known tablet terminals and slate terminals include. For example, when the information terminal 10 is implemented as a mobile communication terminal, the information terminal 10 may further include function units, such as a radio communication unit and a global positioning system (GPS) receiver, that communicate via an antenna and a mobile communication network.

The touch panel 11 is a device that is capable of displaying and on which inputs can be made. According to a mode, the touch panel 11 displays an image that is output by an operation system (OS) and the application program. As another mode, the touch panel 11 receives a touching operation, such as tap, flick, sweep, pinch-in, or pinch-out made on the screen.

The camera 12 is an imaging device on which an image sensor, such as a charge coupled device (CCD) or a complementary metal oxide semiconductor (CMOS), is mounted. For example, on the camera 12, three or more types of light receiving elements for, for example, red (R), green (G), and blue (B) can be mounted. As an example of implementation of the camera 12, an in-camera that is provided to the same surface as that of the screen of, for example, a tablet terminal or a slate terminal can be appropriated. The case where the information terminal 10 includes the camera 12 is exemplified here; however, the information terminal 10 does not necessarily include the camera 12 if an image can be acquired via a network or a storage device.

For example, the camera 12 starts imaging in response to a touching operation corresponding to a command for, for example, authentication for screen unlocking or log-in on the touch panel 11. The imaging area of the camera 12 provided to the side of the screen of the information terminal 10 covers, in addition to the face of the user of the information terminal 10 that views the display on the screen, the neck, the cloth, etc. Accordingly, the image captured by the camera 12 contains, in addition to the face of the user of the information terminal 10, the neck, the cloth, etc. An image that is captured by the camera 12 can be referred to as a "face image" below.

The vein sensor 13 is a sensor that captures a blood-vessel pattern of veins that are inside the palm. According to a mode, the vein sensor 13 is configured by including an illuminator that emits near infrared light and an imaging device including an image sensor capable of capturing the near infrared light. For example, for the imaging device, an out-camera that is provided on the back of the screen of a tablet terminal or a slate terminal can be appropriated.

The vein sensor 13 is provided near the end of the information terminal 10. For example, if the information terminal 10 has a rectangular housing, the vein sensor 13 is provided on the opposite surface to the surface on which the screen is set, i.e., on the back, and near any one of the four corners of the housing. For this reason, when the palm is disposed in an appropriate size at the center of the imaging area of the vein sensor 13, the user who holds his/her hand up to the vein sensor 13 on the back of the screen while looking at the display on the screen may view part of his/her fingers protruding over the screen.

In response to, for example, a touch operation corresponding to a command for authentication for screen unlocking or login on the touch panel 11, the vein sensor 13 starts imaging. In other words, the vein sensor 13 emits near infrared light from the illuminator. Accordingly, the vein sensor 13 gathers, on the imaging device that is started in association with the emission of the infrared light from the illuminator, the reflected light that is the infrared light having reflected from the surface or the inside of the palm. As a result, photoelectric conversion on the reflected light gathered on the imaging device is performed and thus an image of the subject within the imaging area of the imaging device is output. When the imaging area covers the palm, the hemoglobin in the veins absorbs the near infrared light, which makes it possible to acquire an image in which the blood vessel pattern of the veins is enhanced. An image that is captured by the vein sensor 13 can be referred to as a "palm image" below. It is here assumed that the palm serves as a part containing veins by which authentication is performed. Alternatively, the back of the hand may serve as a part by which authentication is performed.

As described above, to perform authentication for screen unlocking or login, the two imaging devices, i.e., both the camera 12 and the vein sensor 13 according to the embodiment, are started to capture images respectively. In this case, images are captured in synchronization between the camera 12 and the vein sensor 13. For example, both of the frame of the palm image captured by the vein sensor 13 and the frame of the face image captured by the camera 12 are associated with each other by using, for example, a frame number. Such association makes it possible to use the images of the same frame number in the following processing as the images captured at the same time point. Capturing the face image and the palm image is different from a normal use in which, in a normal information terminal, one of cameras is started according to switching between imaging modes and the camera is exclusively used while the other camera stops.

As a trigger for starting capturing of a palm image, a tap operation for authentication for unlocking or login is exemplified here; however, the trigger is not limited to this example. For example, imaging may be started by an operation on a physical key, such as a button (not represented). Alternatively, the camera 12 and the vein sensor 13 may be started without any specific trigger and, when a certain gesture, such as a wink or a V-sign, is detected from an image that is captured by any one of the imaging devices, positioning of the palm may be started.

The distance sensor 14 is a sensor that measures the distance between two points. According to a mode, the distance sensor 14 sends wave motions, such as infrared rays, radio waves, or ultrasonic waves, toward a direction indicated by the viewpoint detector 16, which will be described below, i.e., a direction corresponding to the position at which the point of view is detected on the face image. Moreover, the distance sensor 14 receives the wave motions that have reflected on the subject and, by calculating the time difference or the phase difference between the sent wave motions and the received wave motions, measures the distance between the distance sensor 14 and the viewpoint.

The proper disposition storage unit 15 is a storage unit that stores proper disposition of a living body with respect to the vein sensor 13. The "proper disposition" denotes a disposition in which, when the user in a standard posture in which the user uses the information terminal 10 holds his/her palm up to the vein sensor, part of the hand is exposed and viewed over the screen. For example, there is a disposition in which, when the user of the information terminal 10 holds the information terminal 10 with one of his/her hands and holds his/her palm up to the vein sensor 13 in a posture in which the user stretches the fingers of the other hand while looking at the display on the screen, the tips of the thumb, index finger, middle finger, and ring finger are exposed and viewed over the screen.

The such disposition is employed for disposing the palm at the center of the imaging area of the vein sensor 13 that is set near the corner of the information terminal and for the following purpose: for, by exposing the fingertips when imaging the palm of the hand opposite to the hand holding the information terminal 10, allowing the user of the information terminal 10 to know how much the vein sensor 13 and the palm are distant from each other.

The distance between the vein sensor 13 and the palm that is determined as proper is determined according to the performance of equipment of the vein sensor 13, such as, in addition to the resolution of the image sensor, the number and type of lenses. It is here assumed that a palm image captured in the same environment as the proper disposition is registered not only when imaging is performed when the palm vein authentication performed, but also when a palm image of the owner of the information terminal 10 is previously registered. A palm image that is previously registered to be matched with a palm image captured by the vein sensor 13 can be referred to as a "registered palm image" below.

According to a mode, the proper disposition storage unit 15 stores specifying information with which it is possible to specify a rectangle obtained by modeling the surface of the palm that is held up to the vein sensor 13, such as three-dimensional coordinates of vertices forming a rectangle, or three-dimensional coordinates of the center of gravity of the rectangle, and the height and width of the rectangle. For the coordinates, for example, relative coordinates with respect to the information terminal 10 are used. The case where the disposition of the palm with respect to the vein sensor 13 is modelled in a rectangle has been exemplified; however, any shape, such as an oval, circle, or polygon may be used for modelling.

The viewpoint detector 16 is a processor that detects the position of the point of view of the user of the information terminal 10. According to a mode, the viewpoint detector 16 performs image processing, such as skin color detection and template matching, on a face image that is captured by the camera 12. For example, by detecting the skin color from the face image, the viewpoint detector 16 extracts the face part contained in the face image. Moreover, by performing template matching on the face area that is extracted by the skin color detection, the viewpoint detector 16 extracts geometrical characteristics, such as the shape and size of organs of the face, such as the eyes, nose, mouth and ears, from the face part image. Accordingly, the positions of the right eye, left eye, or both the right and left eyes on the face image are specified.

After specifying the position of the eye on the face image, the viewpoint detector 16 causes the distance sensor 14 to send wave motions in the direction corresponding to the position of the eye on the face image to cause the distance sensor 14 to measure the distance between the distance sensor 14 and the eye of the user of the information terminal 10. The direction in which the distance sensor 14 is caused to send wave motions may be the direction corresponding to the center of the right eye on the face image or the direction corresponding to the center of the left eye, or the direction corresponding to the middle point between the eyes. Thereafter, the viewpoint detector 16 calculates the coordinates in a three-dimensional space at which the eye of the user of the information terminal 10 positions, i.e., the position of the viewpoint, from the distance to the eye of the user of the information terminal 10 measured by the distance sensor 14, the previously-detected position of the eye on the face image, and the coordinates of the distance sensor 14.

The display controller 17 is a processor that performs display control on the touch panel 11. According to a mode, the display controller 17 determines the size and position of the palm image captured by the vein sensor 13 and to be displayed on the touch panel 11 from the position of the viewpoint detected by the viewpoint detector 16 and the proper disposition of the palm stored in the proper disposition storage unit 15.

Figure 2:
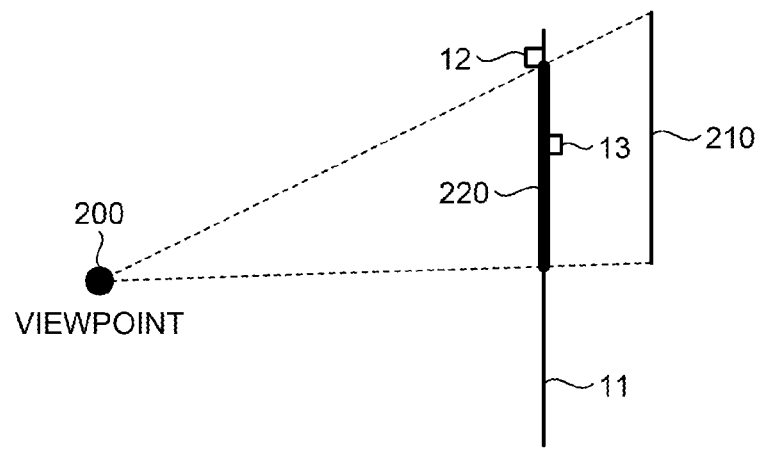
FIG. 2 is a diagram illustrating an exemplary method of determining a display area of a palm image.
Figure 3:
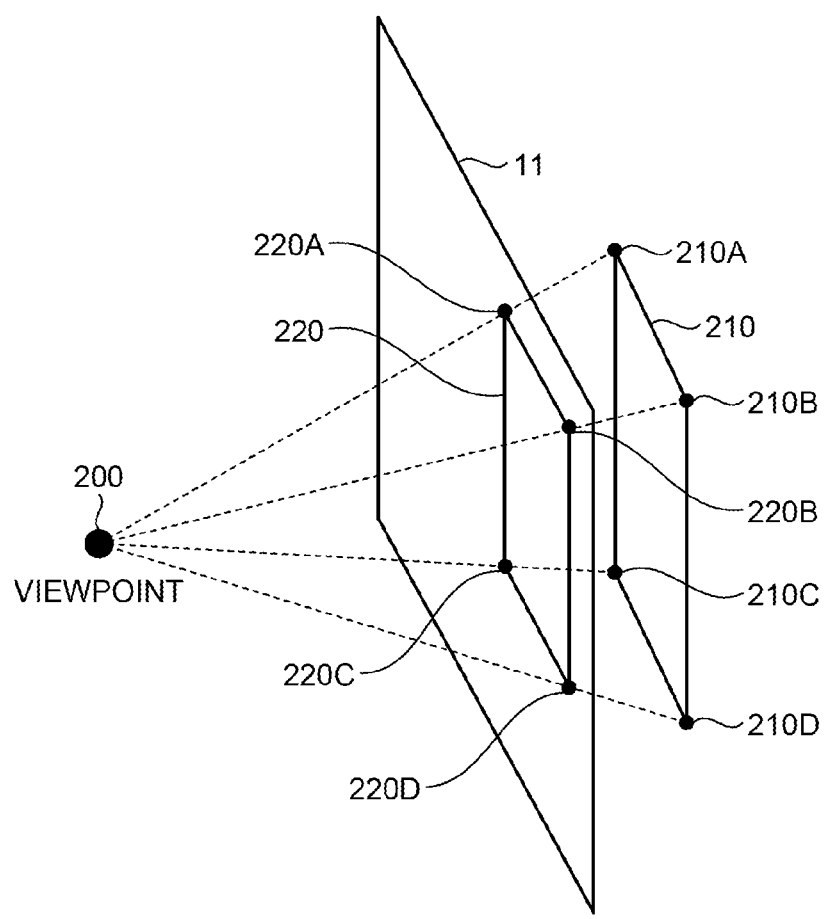
FIG. 3 is a diagram illustrating the exemplary method of determining a display area of a palm image.

FIGS. 2 and 3 are diagrams illustrating an exemplary method of determining a display area of a palm image. FIG. 2 illustrates a side view of the screen of the information terminal 10 when viewed from its side surface, and FIG. 3 illustrates an oblique view of the screen of the information terminal 10 when viewed obliquely. FIG. 3 does not illustrate the camera 12 and the vein sensor 13.

As illustrated in FIG. 2, when a viewpoint 200 and each of the vertices contained in the rectangular proper disposition 210 are connected with a line segment, the position and size of a display area 220 projected onto the screen of the touch panel 11 are determined as a display position and a display size. For example, as illustrated in FIG. 3, the position and size displayed on the touch panel 11 are defined by the four intersections 220A to 220D corresponding to the line segments.

The intersection 220A represents the point at which the line segment connecting the viewpoint 200 and the vertex 210A intersects with the screen of the touch panel 11 and the intersection 220B represents the point at which the line segment connecting the viewpoint 200 and the vertex 210B intersects with the screen of the touch panel 11. The intersection 220C represents the point at which the line segment connecting the viewpoint 200 and the vertex 210C intersects with the screen of the touch panel 11, and the intersection 220D denotes the point at which the line segment connecting the viewpoint 200 and the vertex 210D intersects with the screen of the touch panel 11.

As described above, the display controller 17 determines, per straight line connecting the viewpoint detected by the viewpoint detector 16 and a vertex contained in the proper disposition stored in the proper disposition storage unit 15, the display area 220 of the palm image by calculating the coordinates of the intersection at which the straight line intersects with the screen of the touch panel 11. The position and size of the display area 220 is determined according to the disposition of the four intersections 220A to 220D. For example, the closer to the screen the viewpoint 200 is, the smaller the size of the display area 220 is. The more the viewpoint is distant from the screen, the closer to the size of the proper disposition 210 the size of the display area 220 is.

Moreover, the display controller 17 displays the palm image captured by the vein sensor 13 in accordance with the pre-determined display position and display size on the touch panel 11. For example, according to the example illustrated in FIGS. 2 and 3, the palm image captured by the vein sensor 13 is displayed on the display area 220 containing the intersections 220A to 220D.

Figure 4:
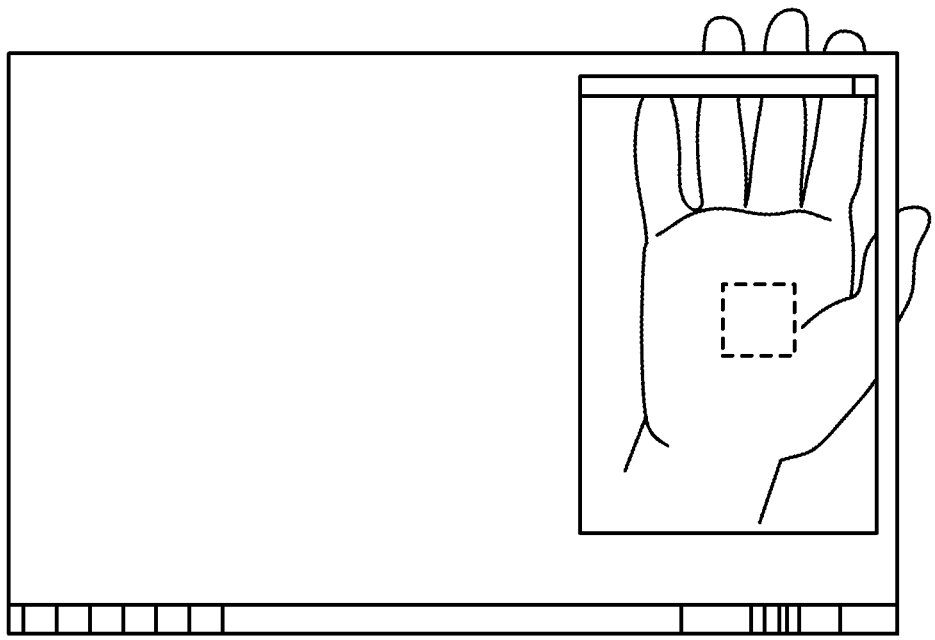
FIG. 4 is a diagram illustrating an exemplary palm image displayed on a touch panel.
Figure 5:
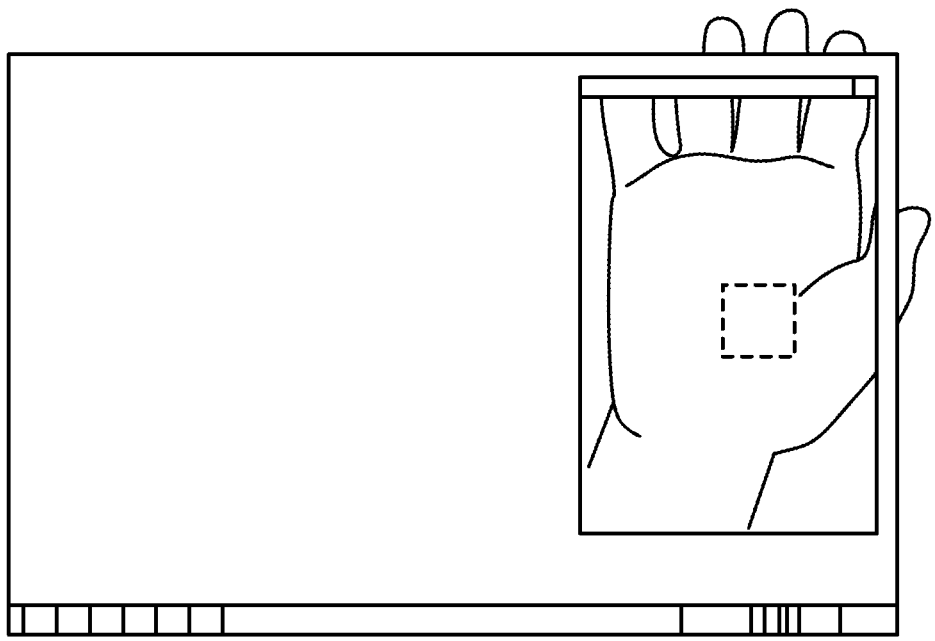
FIG. 5 is a diagram illustrating an exemplary palm image displayed on the touch panel.
Figure 6:
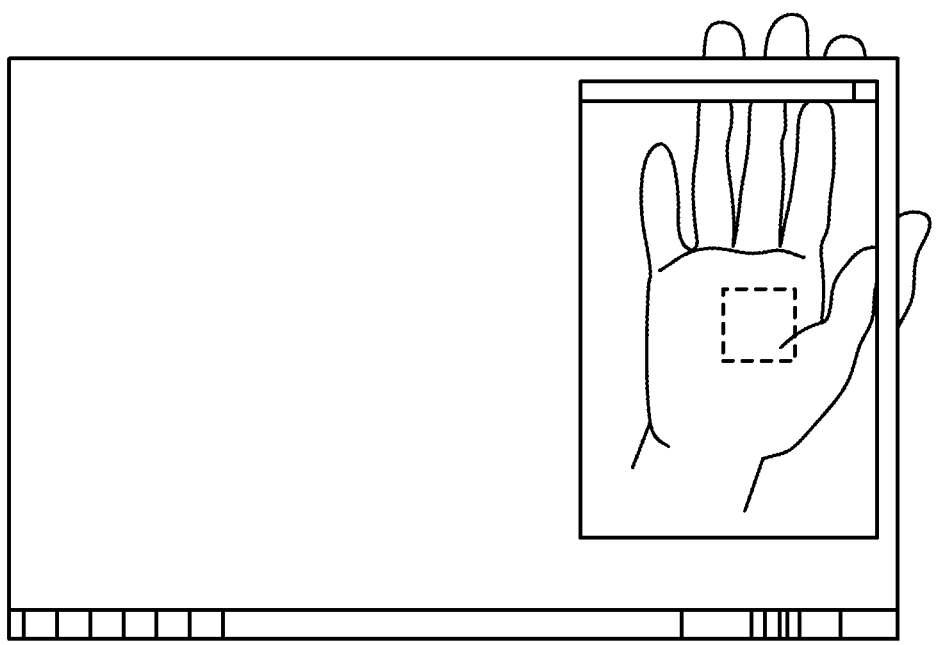
FIG. 6 is a diagram illustrating an exemplary palm image displayed on the touch panel.

FIGS. 4 to 6 are diagrams illustrating exemplary palm images displayed on the touch panel 11. FIG. 4 illustrates a mode in which the palm is held up at the position matching the proper disposition 210. When the palm is held up at the position at which the palm matches the proper disposition 210, the ends of fingers in the palm image displayed on the touch panel 11 and the real fingertips exposed over the screen are naturally viewed as if they are connected. Such display of the palm image allows the user of the information terminal 10 to check a circumstance that the palm is presented at the proper position and accordingly the user can hold his/her palm at the current presentation position until the palm vein authentication ends.

FIG. 5 illustrates a mode in which the palm is held up at a position closer to the screen than the proper disposition 210 is. When the palm is held up at a position closer to the screen than the proper disposition 210 is as described above, the scale of the palm including the fingers in the palm image displayed on the touch panel 11 is displayed greater than the scale of the real fingertips exposed over the screen. This results from the fact that a wide-angle lens is provided to the vein sensor 13 in many cases because the distance from the vein sensor 13 to the fingertips is shorter than the distance from the viewpoint of the user of the information terminal 10 to the fingertips. For this reason, even when the palm gets closer to the screen than the proper disposition 210 is so slightly that it is difficult for the user who looks at the fingertips over the screen to see it is closer than the proper disposition, it is possible to display the palm image in which the palm and the fingertips are imaged in a scale larger than the scale of the real fingertips viewed over the screen. Such display of the palm image allows the user of the information terminal 10 to check a circumstance that the palm is presented closer than the proper position is and accordingly to determine that it is preferable to present the palm more apart from the housing of the information terminal 10 than the current presentation position is.

FIG. 6 illustrates a mode where the palm is held up in a position more apart from the screen than the proper disposition 210 is. When the palm is held up at a position more apart from the screen than the proper disposition 210 is as described above, the scale of the palm including the fingers in the palm image displayed on the touch panel 11 is displayed smaller than the scale of the real fingers exposed over the screen. For this reason, even when the palm becomes more distant from the screen than the proper disposition 210 is so slightly that it is difficult for the user who looks at the fingertips over the screen to see it is closer than the proper disposition, it is possible to display the palm image in which the palm and the fingertips are imaged in a scale smaller than the scale of the real fingertips viewed over the screen. Such display of the palm image allows the user of the information terminal 10 to check a circumstance that the palm is presented more distant than the proper position is and accordingly to determine that it is preferable to present the palm closer to the housing of the information terminal 10 than the current presentation position is.

Furthermore, according to the examples illustrated in FIGS. 4 to 6, different from the display of the palm image in front of the viewpoint of the user of the information terminal 10, the palm image is displayed in the direction, shifted from the right front, toward the proper disposition from the viewpoint of the user of the information terminal 10. For this reason, the user of the information terminal 10 can also present the palm while intuitively knowing the field of view of the vein sensor 13 that is set on the back of the screen and thus is difficult to view. Furthermore, as illustrated in FIGS. 4 to 6, by displaying the center position of the area from which a pattern of blood vessels inside the palm is extracted such that the center position is superimposed onto the palm image, it is possible to position the palm by using the center position as the sight.

Descriptions will be given again for FIG. 1. The authentication unit 18 is a processor that performs palm vein authentication. According to a mode, the authentication unit 18 extracts an amount of characteristics on the blood vessel pattern of veins from the palm image captured by the vein sensor 13. For example, the authentication unit 18 takes out the blood vessel part from the palm image, thins the blood vessel part, and extracts, as vein data, the amounts of characteristics, such as the coordinates of a junction in the blood vessels, the length between junctions, and the junction angle of a junction. Moreover, the authentication unit 18 calculates a matching score between the vein data extracted from the palm image and the pre-registered vein data on, for example, the owner of the information terminal 10. By registering multiple sets of vein data on persons permitted to use the information terminal 10, it is possible to perform, in addition to 1:1 authentication, 1:N authentication. When the highest matching score from among the pre-calculated matching scores is equal to or larger than a given threshold, the authentication unit 18 determines that the palm vein authentication succeeded. When the highest matching score is less than the given threshold, the authentication unit 18 determines that the palm vein authentication failed. The authentication result from performing of the palm vein authentication by the authentication unit 18 described above is output to the OS that performs authentication for unlocking or login and the application program. The authentication unit 18 can employ any matching method, such as a minutia method, a pattern matching method, or a frequency analysis method.

The authentication unit 18 does not necessarily perform palm vein authentication soon after a palm image is captured by the vein sensor 13. In other words, each time the vein sensor 13 captures a palm image, the authentication unit 18 determines whether the palm in the palm image is disposed at a proper position. For example, the authentication unit 18 can perform palm vein authentication when the difference between the diameter of a finger in the palm image captured by the vein sensor 13 and the diameter of the finger of the pre-registered vein data is equal to or smaller than a given threshold. The authentication unit 18 can also perform the palm vein authentication when receiving an input of a given audio message, such as "OK", from the user of the information terminal 10. Even when the authentication unit 18 fails in the palm vein authentication, it is possible to display the palm image on the touch panel 11 by using the display controller 17 and retry the palm vein authentication until the number of times of retry reaches a given number of times.

It is possible to implement the above-described viewpoint detector 16, the display controller 17, and the authentication unit 18 by causing a central processing unit (CPU) or a micro processing unit (MPU) to execute the image processing program. The above-described function units may be implemented by using a hard wired logic, such as an application specific integrated circuit (ASIC) or a field programmable gate array (FPGA).

For the above-described proper disposition storage unit 15, a semiconductor memory device or a storage device can be used. For example, as exemplary semiconductor memory devices, there are a video random access memory (VRAM), a random access memory (RAM), a read only memory (ROM), and a flash memory. Furthermore, as an exemplary storage device, there is a storage device, such as a hard disk or an optical disk.

[Flow of Processing]

Figure 7:
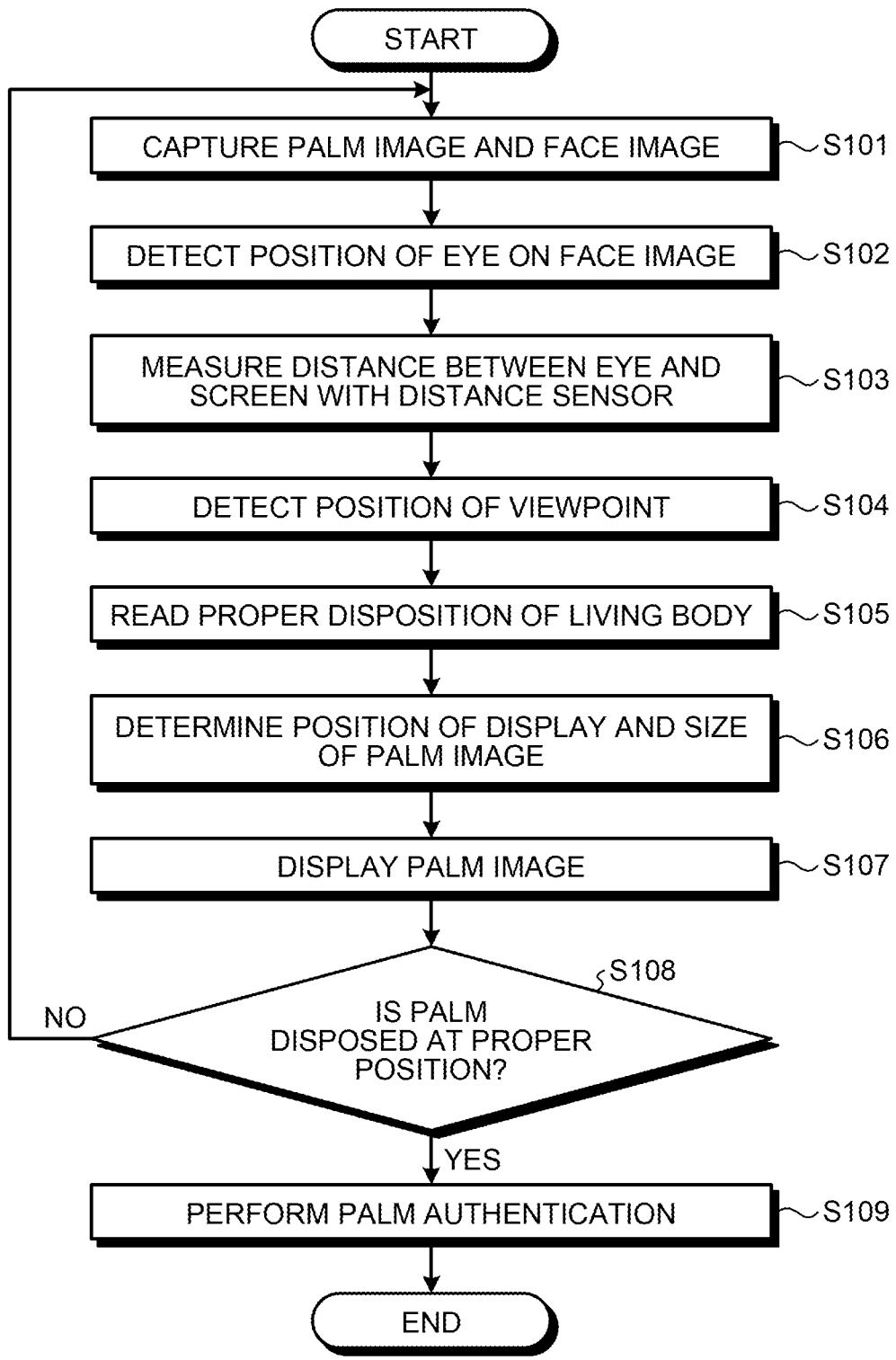
FIG. 7 is a flowchart illustrating a procedure of authentication processing according to the first embodiment.

FIG. 7 is a flowchart illustrating a procedure of the authentication processing according to the first embodiment. The authentication processing starts, for example, when a touch operation corresponding to a command for authentication for screen unlocking or login authentication is performed on the touch panel 11.

As illustrated in FIG. 7, when the camera 12 captures a face image and the vein sensor 13 captures a palm image (step S101), the viewpoint detector 16 detects the position of an eye of a user on the face image captured at step S101 (step S102).

By causing the distance sensor 14 to send wave motions to the direction corresponding to the position of the eye on the face image detected at step S102, the viewpoint detector 16 causes the distance sensor 14 to measure the distance between the distance sensor 14 and the eye of the user of the information terminal 10 (step S103).

From the distance to the eye of the user of the information terminal 10 measured at step S103, the position of the eye on the face image detected at step S102, and the coordinates of the distance sensor 14, the viewpoint detector 16 then calculates the coordinates in a three-dimensional space at which the eye of the user of the information terminal 10 positions, i.e., the position of the viewpoint (step S104).

The display controller 17 reads a proper disposition stored in the proper disposition storage unit 15 (step S105). Thereafter, the display controller 17 determines a display area of the palm image, i.e., the display position and the display size, by calculating, per straight line connecting the viewpoint detected at step S104 and a vertex contained in the proper disposition read at step S105, the coordinates of the intersection between the straight line and the screen (step S106).

The display controller 17 displays, on the touch panel 11, the palm image that is captured at step S101 in accordance with the display position and the display size that are determined at step S106 (step S107).

The processing of steps S101 to S107 is repeatedly performed until the authentication unit 18 determines that the palm contained in the palm image is disposed at a proper position (NO at step S108).

Thereafter, when the palm contained in the palm image is disposed in a proper position (YES at step S108), the authentication unit 18 performs the following processing: the authentication unit 18 performs palm vein authentication by matching vein data extracted from the palm image captured at step S101 and pre-registered vein data (step S109), outputs the authentication result to an OS or an application program running on the information terminal 10, and ends the processing.

[Effect of First Embodiment]

As described above, in the information terminal 10 according to the embodiment, when the vein sensor 13 that is set at the back of the screen images the palm, the position and size of the palm image to be displayed on the screen are changed in accordance with the position of the eye imaged on the camera 12 that is set at the same surface as that of the screen. For example, when part of the hand, i.e., fingertips, is exposed over the screen, it is possible to perform positioning such that the palm is positioned at the center of the palm image and the scale of the palm and fingers in the palm image matches the scale of the exposed real fingers. For this reason, according to the information terminal 10 according to the embodiment, even when the vein sensor 13 is set at the back of the screen, it is possible to increase the positioning accuracy. Thus, the information terminal 10 according to the embodiment can improve the authentication accuracy.

Second Embodiment

For the first embodiment, the case has been exemplified where the distance sensor 14 is used to detect the position of the viewpoint of the user of the information terminal 10; however, the distance sensor 14 is not necessarily included depending on the type of the information terminal. For the second embodiment, an information terminal 20 that estimates the position of the viewpoint of a user without the distance sensor 14 will be described below.

Figure 8:
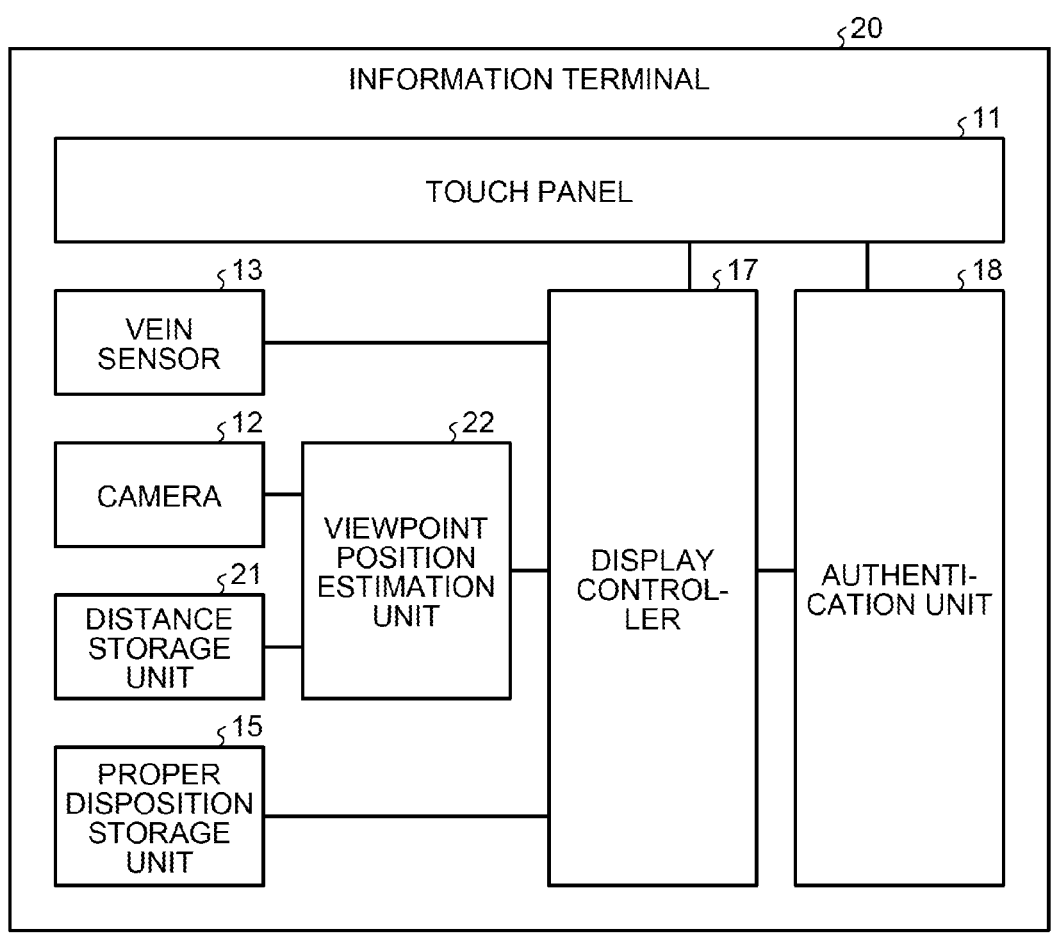
FIG. 8 is a block diagram illustrating a functional configuration of an information terminal according to a second embodiment.

FIG. 8 is a block diagram illustrating a functional configuration of the information terminal 20 according to a second embodiment. The information terminal 20 is different from the information terminal 10 represented in FIG. 1 in that the information terminal 20 includes a distance storage unit 21 and a viewpoint position estimation unit 22. In FIG. 8, processing units different in function from those of the information terminal 10 represented in FIG. 1 are denoted with different numerals, and processing units having the same functions as those of the information terminal 10 are denoted by the same reference numerals and the descriptions thereof will be omitted.

The distance storage unit 21 is a storage unit that stores the distances to the information terminal 20. According to a mode, the distance storage unit 21 stores data in which the number of pixels forming the width of the face on a face image, from imaging of a standard person by the camera 12, and the distance measured between the face of the standard person and the information terminal 20 are associated with each other. The "standard person" refers to, for example, a person whose width of the face is statistically an average or a median. The case where the width of the face and the distance to the information terminal 20 are stored in association with each other has been exemplified; however, it suffices if the distance between characteristic points is used, and the length of the face, or the distance between the left and right eyes, and the distance to the information terminal 20 may be stored in association with each other. The case has been exemplified where the width of the face on the face image and the measured distance from the imaging of the standard person by the camera 12 are stored. Alternatively, the width of the face and the measured distance from imaging of the owner of the information terminal 20 by the camera 12 may be previously acquired.

While the viewpoint position estimation unit 22 is common with the viewpoint detector 16 represented in FIG. 1 in the processing until specifying of the position of the right eye, the left eye, or the right and left eyes on the face image, they are different with respect to the subsequent processing. Specifically, the viewpoint position estimation unit 22 reads the width of the imaged face of the standard person and the measured distance to the information terminal 20 from the distance storage unit 21. The viewpoint position estimation unit 22 counts the number of pixels forming the width of the face of the user of the information terminal 20 from a face image captured by the camera 12, by performing image processing, such as skin color detection or template matching. The viewpoint position estimation unit 22 then calculates a ratio between the width of the face of the user of the information terminal 20, for which the number of pixels is counted from the face image, and the number of pixels of the width of the face on the face image from imaging of a standard person by the camera 12, e.g., the quotient obtained by dividing the former width by the latter width. Moreover, the viewpoint position estimation unit 22 calculates the distance between the face of the user of the information terminal 20 and the information terminal 20 by multiplying the measured distance between the face of the standard person and the information terminal 20, which is read from the distance storage unit 21, by an inverse of the previously-calculated ratio, i.e., an inverse of the quotient.

Accordingly, it is possible to regard the width of the face of the user of the information terminal 20 as the width of the standard person and, in accordance with the scaling up/down of the width of the face obtained by this capturing of the face image, correct the measured distance from previous imaging of the standard person. For example, when the user of the information terminal 20 keeps his/her face closer to the screen than the face of the previously-imaged standard person was, the width of the face of the user is detected in a larger scale. In this case, because the above-described ratio is calculated to be greater than 1, it is possible to correct the measured distance, from previous imaging of the standard person, to be smaller by multiplying the measured distance by the inverse of the ratio. On the other hand, when the user of the information terminal 20 keeps his/her face more away from the screen than the previously-imaged face of the standard person was, the width of the face of the user is detected in a smaller scale. In this case, because the above-described ratio is calculated to be smaller than 1, it is possible to correct the measured distance, from previous imaging of the standard person, to be greater by multiplying the measured distance by the inverse of the ratio. Here, the case has been exemplified where the ratio is calculated. Alternatively, the difference between the widths may be calculated. For example, it suffices if, while the measured distance is corrected to be greater when the width of the face of the user of the information terminal 20 is smaller than the width of the previously-imaged face of the standard person, the measured distance is corrected to be smaller when the width of the face of the user of the information terminal 20 is larger than the width of the previously-imaged face of the standard person.

Thereafter, from the previously-estimated distance to the face of the user of the information terminal 20, the previously-detected position of the eye on the face image, and the coordinates of the information terminal 20, e.g., the coordinates of the center of gravity of the screen, the viewpoint position estimation unit 22 estimates the coordinates in a three-dimensional space at which the eye of the user of the information terminal 20 positions, i.e., the position of the viewpoint.

Figure 9:
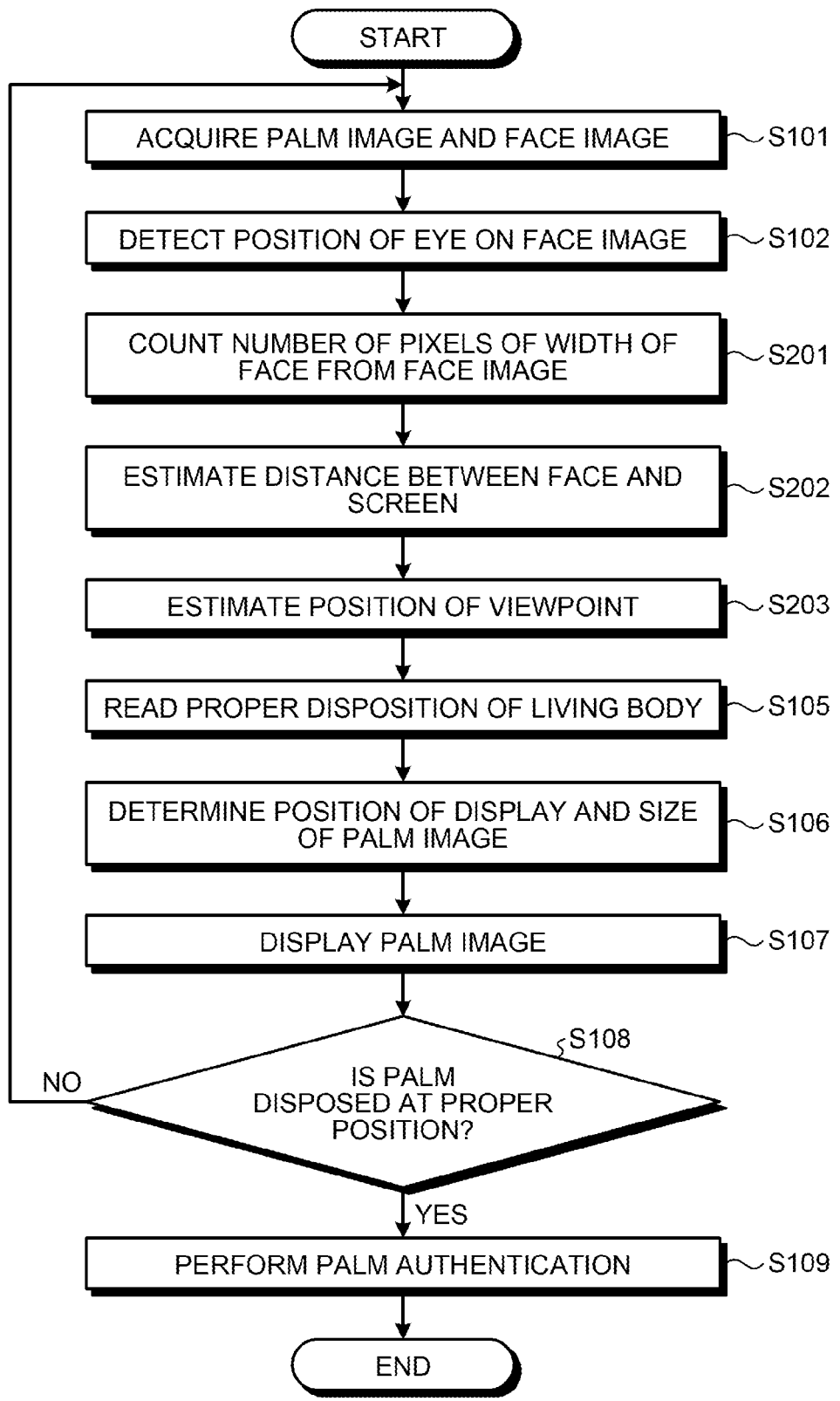
FIG. 9 is a flowchart illustrating a procedure of authentication processing according to the second embodiment.

FIG. 9 is a flowchart illustrating a procedure of authentication processing according to the second embodiment. As in the case of the flowchart illustrated in FIG. 7, the authentication processing stats when a touch operation corresponding to a command for authentication for screen unlocking or login is performed on the touch panel 11.

As illustrated in FIG. 9, when the camera 12 captures a face image and the vein sensor 13 captures a palm image (step S101), the viewpoint position estimation unit 22 detects the position of an eye of a user on the face image captured at step S101 (step S102).

By performing image processing, such as skin color detection or template matching, the viewpoint position estimation unit 22 counts the number of pixels forming the width of the face of the user of the information terminal 20 from the face image captured at step S101 (step S201).

Using the ratio between the number of pixels of the width of the face counted at step S201 and the number of pixels of the width of the face on a face image stored in the distance storage unit 21, the viewpoint position estimation unit 22 then estimates the distance between the face of the user of the information terminal 20 and the information terminal 20 by correcting the measured distance between the face of a standard person and the information terminal 20 stored in the distance storage unit 21 (step S202).

Thereafter, from the distance to the eye of the user of the information terminal 20 estimated at step S202, the position of the eye on the face image detected at step S102, and the coordinates of the information terminal 20, the viewpoint position estimation unit 22 calculates the coordinates in a three-dimensional space at which the eye of the user of the information terminal 20 positions, i.e., the position of the viewpoint (step S203).

The display controller 17 reads a proper disposition stored in the proper disposition storage unit 15 (step S105). Thereafter, the display controller 17 determines a display area of the palm image, i.e., the display position and display size, by calculating, per straight line connecting the viewpoint estimated at step S203 and a vertex contained in the proper disposition read at step S105, the coordinates of the intersection between the straight line and the screen (step S106).

The display controller 17 displays, on the touch panel 11, the palm image captured at step S101 in accordance with the display position and the display size that are determined at step S106 (step S107).

The processing of steps S101 to S107 is repeatedly performed until the authentication unit 18 determines that the palm contained in the palm image is disposed at a proper position (NO at step S108).

Thereafter, when the palm contained in the palm image is disposed in a proper position (YES at step S108), the authentication unit 18 performs the following processing: the authentication unit 18 performs palm vein authentication by matching vein data extracted from the palm image captured at step S101 and pre-registered vein data (step S109), outputs the authentication result to an OS or an application program running on the information terminal 20, and ends the processing.

[Effect of Second Embodiment]

As described above, in the information terminal 20 according to the second embodiment, even when the vein sensor 13 is set at the back of the screen, it is possible to increase the positioning accuracy, which improves the authentication accuracy as according to the above-described first embodiment.

Furthermore, because the width of the face of the user of the information terminal 20 is regarded as the width of the standard person and the measured distance from previous imaging of the standard person is corrected in accordance with the scaling up/down of the width of the face obtained by this capturing of the face image, the information terminal 20 according to the second embodiment is capable of estimating the position of the viewpoint without hardware, such as the distance sensor 14.

Third Embodiment

For the second embodiment, the case has been exemplified where the position of the viewpoint of the user of the information terminal 20 is estimated from the width of the face in the face image captured by the camera 12; however, the width of the face is not necessarily used to estimate the position of the viewpoint. For the third embodiment, an information terminal 30 that estimates the position of the viewpoint of a user by using a palm image captured by the vein sensor 13 will be described below.

Figure 10:
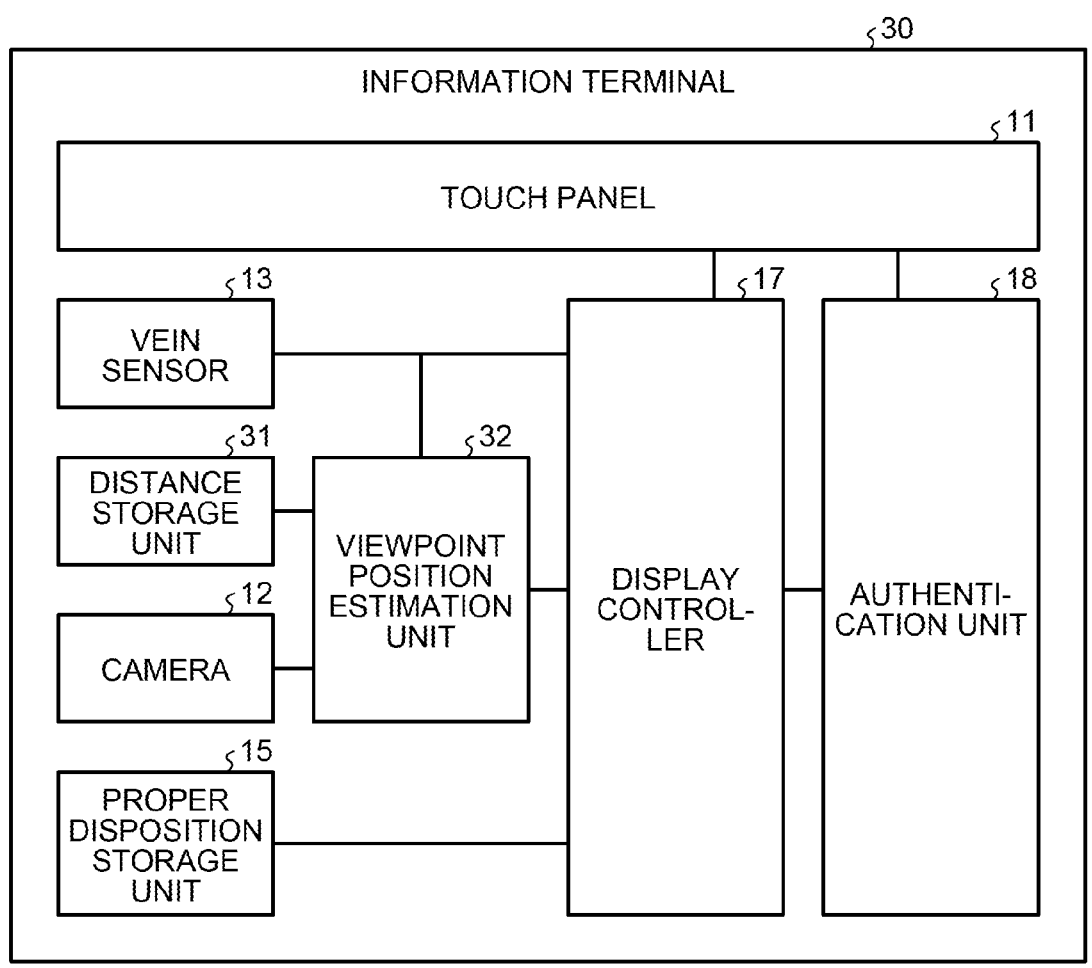
FIG. 10 is a block diagram illustrating a functional configuration of an information terminal according to a third embodiment.

FIG. 10 is a block diagram illustrating a functional configuration of the information terminal 30 according to a third embodiment. The information terminal 30 represented in FIG. 10 is different from the information terminal 20 represented in FIG. 8 in that the information terminal 30 includes a distance storage unit 31 and a viewpoint position estimation unit 32. In FIG. 10, processing units different in function from those of the information terminal 20 represented in FIG. 8 are denoted with different numerals, and processing units having the same functions as those of the information terminal 20 are denoted by the same reference numerals and the descriptions thereof will be omitted.

The distance storage unit 31 is a storage unit that stores the distance to the information terminal 30. According to a mode, the distance storage unit 31 stores data in which the number of pixels forming the width of the palm on a palm image, from imaging of a standard person by the vein sensor 13, and the distance between the face of the standard person and the information terminal 30 are associated with each other. The "standard person" refers to, for example, a person whose width of the palm is statistically an average or a median. The case has been exemplified where the width of the palm and the distance to the information terminal 30 are stored in association with each other. Alternatively, the height of the palm, or the lengths of fingers, and the measured distance may be stored in association with each other. The case has been described where the width of the palm on the palm image and the measured distance from the imaging of the standard person by the vein sensor 13 are stored. Alternatively, the width of the palm and the measured distance from imaging of the owner of the information terminal 30 by the vein sensor 13 may be previously acquired.

While the viewpoint position estimation unit 32 is common with the viewpoint position estimation unit 22 represented in FIG. 8 in the processing until specifying of the position of the right eye, the left eye, or the right and left eyes on the face image, they are different with respect to the subsequent processing. Specifically, from the distance storage unit 21, the viewpoint position estimation unit 32 reads the width of the imaged palm of the standard person and the measured distance to the information terminal 30. The viewpoint position estimation unit 32 counts the number of pixels forming the width of the palm of the user of the information terminal 30 from the palm image captured by the vein sensor 13, by performing image processing, such as skin color detection or template matching. The viewpoint position estimation unit 32 then calculates a ratio between the width of the palm of the user of the information terminal 30, for which the number of pixels is counted from the palm image, and the number of pixels of the width of the palm on the palm image from imaging of a standard person by the vein sensor 13, e.g., the quotient obtained by dividing the former width by the latter width. Moreover, the viewpoint position estimation unit 32 calculates the distance between the face of the user of the information terminal 30 and the information terminal 30 by multiplying the measured distance between the face of the standard person and the information terminal 30, which is read from the distance storage unit 31, by the previously-calculated ratio, i.e., the quotient.

Accordingly, because the width of the palm of the user of the information terminal 30 and the distance between the information terminal 30 and the eye of the user of the information terminal 30 derive from the physical constitution, they are regarded to be proportional to each other and the measured distance from previous imaging of the standard person can be corrected in accordance with the scaling up/down of the width of the palm obtained by this capturing of the palm image. For example, when the palm of the user of the information terminal 30 is larger than the palm of the previously-imaged standard person, the width of the palm is detected in a larger scale. In this case, because the above-described ratio is calculated to be greater than 1, it is possible to correct the measured distance, from previous imaging of the standard person, to be greater by multiplying the measured distance by the ratio. On the other hand, when the palm of the user of the information terminal 30 is smaller than the palm of the previously-imaged standard person, the width of the palm is detected in a smaller scale. In this case, because the above-described ratio is calculated to be smaller than 1, it is possible to correct the measured distance, from previous imaging of the standard person, to be smaller by multiplying the measured distance by the ratio. Here, the case has been described where the ratio is calculated. Alternatively, the difference between the widths may be calculated. For example, it suffices if, while the measured distance is corrected to be smaller when the width of the palm of the user of the information terminal 30 is smaller than the width of the previously-imaged palm of the standard person, the measured distance is corrected to be greater when the width of the palm of the user of the information terminal 30 is larger than the width of the previously-imaged palm of the standard person.

Thereafter, from the previously-estimated distance to the face of the user of the information terminal 30, the previously-detected position of the eye on the face image, and the coordinates of the information terminal 30, e.g., the coordinates of the center of gravity of the screen, the viewpoint position estimation unit 32 estimates the coordinates in a three-dimensional space at which the eye of the user of the information terminal 30 positions, i.e., the position of the viewpoint.

Figure 11:
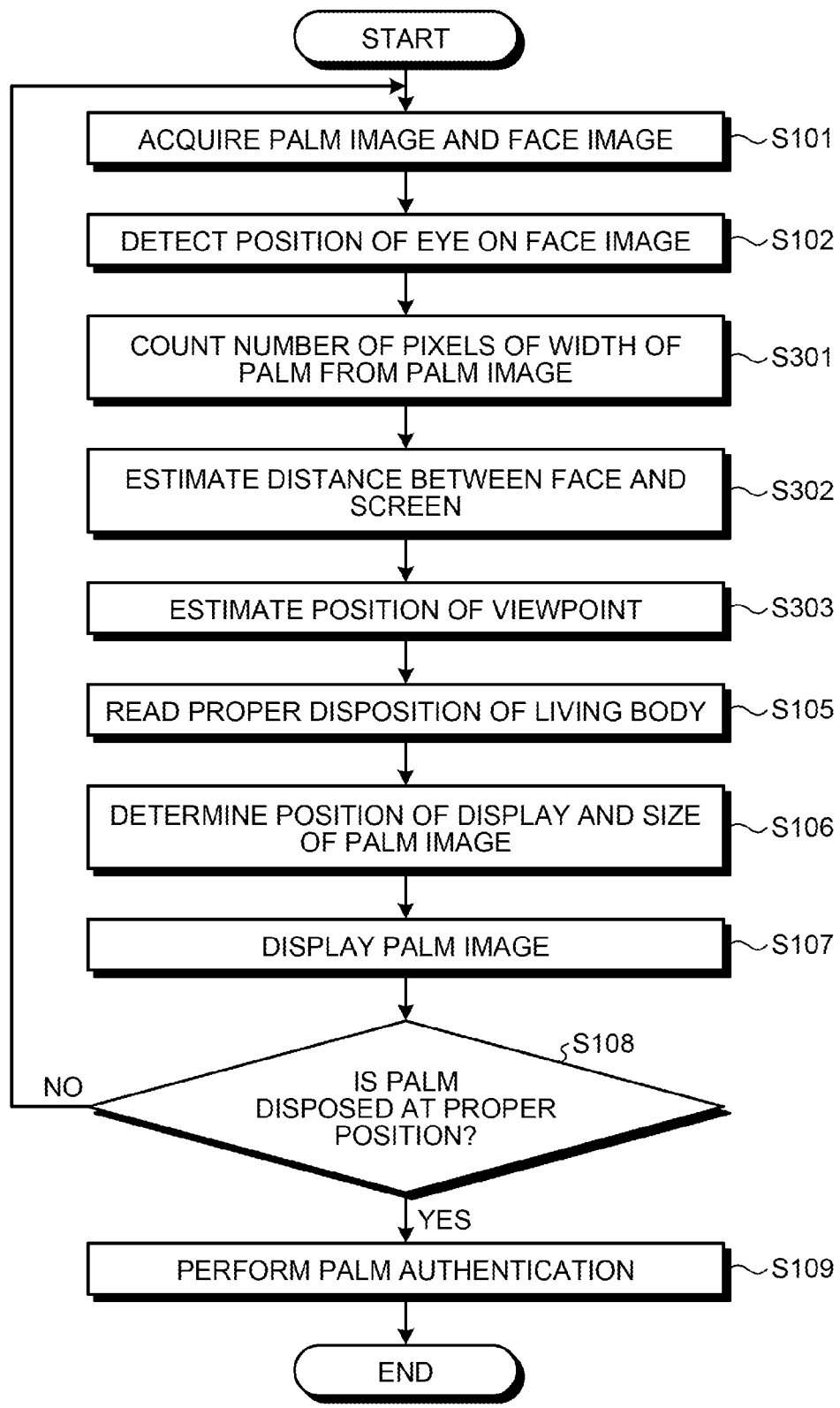
FIG. 11 is a flowchart illustrating a procedure of authentication processing according to the third embodiment.

FIG. 11 is a flowchart illustrating a procedure of authentication processing according to the third embodiment. As in the case of the flowchart illustrated in FIG. 7, the authentication processing stats when a touch operation corresponding to a command for authentication for screen unlocking or login is performed on the touch panel 11.

As illustrated in FIG. 11, when the camera 12 captures a face image and the vein sensor 13 captures a palm image (step S101), the viewpoint position estimation unit 32 detects the position of an eye of a user on the face image captured at step S101 (step S102).

By performing image processing, such as skin color detection or template matching, the viewpoint position estimation unit 32 counts the number of pixels forming the width of the palm of the user of the information terminal 30 from the palm image captured at step S101 (step S301).

Using the ratio between the number of pixels of the width of the palm counted at step S301 and the number of pixels of the width of the palm on the palm image stored in the distance storage unit 31, the viewpoint position estimation unit 32 then estimates the distance between the face of the user of the information terminal 30 and the information terminal 30 by correcting the measured distance between the face of the standard person and the information terminal 30 stored in the distance storage unit 31 (step S302).

Thereafter, from the distance to the eye of the user of the information terminal 30 estimated at step S302, the position of the eye on the face image detected at step S102, and the coordinates of the information terminal 30, the viewpoint position estimation unit 32 estimates the coordinates in a three-dimensional space at which the eye of the user of the information terminal 30 positions, i.e., the position of the viewpoint (step S303).

The display controller 17 reads a proper disposition stored in the proper disposition storage unit 15 (step S105). Thereafter, the display controller 17 determines a display area of the palm image, i.e., the display position and the display size, by calculating, per straight line connecting the viewpoint estimated at step S303 and a vertex contained in the proper disposition read at step S105, the coordinates of the intersection between the straight line and the screen (step S106).

The display controller 17 displays, on the touch panel 11, the palm image captured at step S101 in accordance with the display position and the display size that are determined at step S106 (step S107).

The processing of steps S101 to S107 is repeatedly performed until the authentication unit 18 determines that the palm contained in the palm image is disposed at a proper position (NO at step S108).

Thereafter, when the palm contained in the palm image is disposed in a proper position (YES at step S108), the authentication unit 18 performs the following processing: the authentication unit 18 performs palm vein authentication by matching vein data extracted from the palm image captured at step S101 and pre-registered vein data (step S109), outputs the authentication result to an OS or an application program running on the information terminal 30, and ends the processing.

Effect of Third Embodiment

As described above, in the information terminal 30 according to the third embodiment, even when the vein sensor 13 is set at the back of the screen, it is possible to increase the positioning accuracy, which improves the authentication accuracy as according to the above-described first embodiment.

Furthermore, in the information terminal 30 according to the third embodiment, because the width of the palm of the user of the information terminal 30 and the distance between the information terminal 30 and the eye of the user of the information terminal 30 are regarded to be proportional to each other, the measured distance from previous imaging of the standard person is corrected in accordance with the scaling up/down of the width of the palm obtained by this capturing of the palm image. Thus, the information terminal 30 according to the third embodiment is capable of estimating the position of the viewpoint without hardware, such as the distance sensor 14.

Fourth Embodiment

The embodiments of the disclosed apparatus have been described. In addition to the above-described embodiments, the present invention may be carried out in various different modes. Other embodiments covered by the invention will be described below.

[Substitute of Camera 12]

For the first to third embodiments, the case where the information terminal 10, 20, or 30 includes the camera 12 is exemplified; however, the information terminal does not necessarily include the camera 12. For example, instead of detecting the position of an eye on the face image, it may be regarded that the viewpoint of the user of the information terminal 10, 20, or 30 is on a given direction with respect the terminal, such as the normal line of the center of the screen, and the direction in which the viewpoint positions with respect to the information terminal 10, 20, or 30 may be stored in, for example, an internal memory. This enables detection or estimation of the viewpoint even if the camera 12 is not provided on the same surface as that of the screen.

[Authentication System]

According to the first to third embodiments, the case has been exemplified where the above-described image processing is performed when palm vein authentication is performed. The embodiments may be applied to a case where authentication other than the palm vein authentication is performed. In other words, the above-described processing may be similarly applied to a case where a device including a camera, a screen, and a sensor for authentication is between the position of an eye of a user and a part by which authentication is performed and the sensor for authentication are apart from each other. For example, the above-described processing, i.e., the processing illustrated in FIG. 7, FIG. 9, and FIG. 11, may be performed when an imaging device set on the back of the information terminal 10, 20, or 30 images the palm print, the back of the hand, or the palm shape (hand print) to perform palm print authentication, back-hand authentication, or palm shape authentication.

The components of each device illustrated in the drawings are not necessarily configured physically as illustrated in the drawings. In other words, specific modes of distribution and integration of each device are not limited to those illustrated in the drawings, and all or part of the device may be configured by functional or physical distribution or integration per arbitrary unit in accordance with various loads or the usage. For example, the viewpoint detector 16 or the display controller 17 may be connected as external devices of the information terminal 10 via a network. Alternatively, different devices may include the viewpoint detector 16 or the display controller 17, respectively, and they may cooperate via a network connection to implement the functions of the information terminal 10.

[Image Processing Program]

Figure 12:
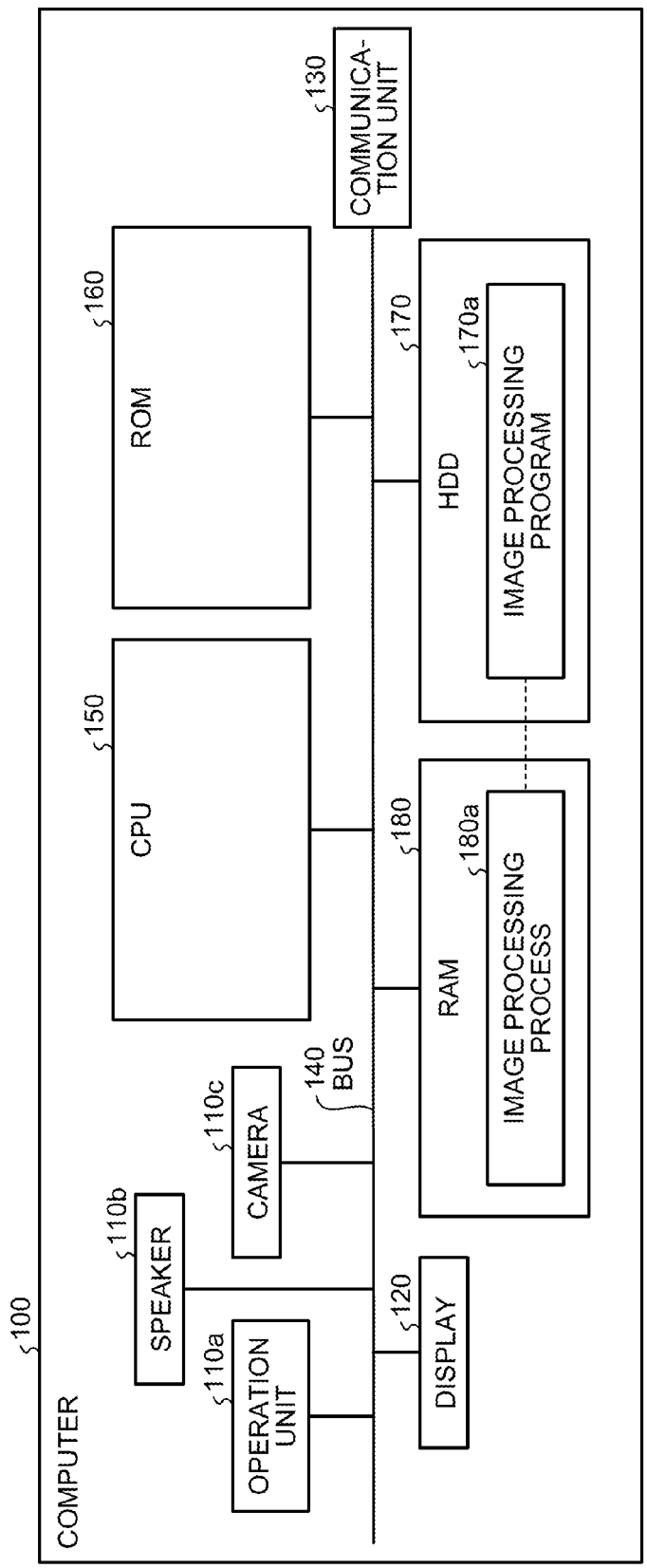
FIG. 12 is a diagram for explaining an exemplary computer that executes an image processing programs according to the first to third embodiments.

The above-described various types of processing described for the above-described embodiments can be implemented in a way that a computer, such as a personal computer or a work station, executes a prepared program. With reference to FIG. 12, an exemplary computer that executes the image processing program with the same functions as those of the above-described embodiments will be described below.

FIG. 12 is a diagram for explaining an exemplary computer that executes the image processing programs according to the first to third embodiments. As illustrated in FIG. 12, a computer 100 includes an operation unit 110a, a speaker 110b, a camera 110c, a display 120, and a communication unit 130. The computer 100 further includes a CPU 150, a ROM 160, a HDD 170, and a RAM 180. The units 110 to 180 are connected via a bus 140.

As illustrated in FIG. 12, an image processing program 170a that implements the same functions as those of the viewpoint detector 16 and the display controller 17 illustrated in the first embodiment is previously stored in the HDD 170. Alternatively, the image processing program 170a that implements the same functions as those of the viewpoint position estimation unit 22 and the display controller 17 illustrated in the second embodiment may be previously stored in the HDD 170. Alternatively, the image processing program 170a that implements the same functions as those of the viewpoint position estimation unit 32 and the display controller 17 illustrated in the third embodiment may be previously stored in the HDD 170. Integration or distribution of the image processing program 170a may be performed as appropriate as that of the components of the functions units represented in FIGS. 1, 8, and 10 may be. In other words, all data stored in the HDD 17 is not necessarily stored in the HDD 170, and it suffices if only data needed for processing is stored in the HDD 170.

The CPU 150 reads the image processing program 170a from the HDD 170 and loads the image processing program 170a in the RAM 180. Accordingly, as illustrated in FIG. 12, the image processing program 170a functions as an image processing process 180a. The image processing process 180a properly loads various types of data read from the HDD 170 in an area allocated to the image processing process 180a in the RAM 180 and performs various types of processing according to the loaded various types of data. The image processing process 180a includes processing performed by the function units represented in FIG. 1, 8 or 10, e.g., the processing illustrated in FIG. 7, 9 or 11. All the processing units virtually implemented in the CPU 150 do not necessarily run on the CPU 150, and it suffices if only processing units needed for processing are virtually implemented.

The above-described image processing program 170a is not necessarily stored in the HDD 170 or the ROM 160 from the beginning. For example, each program may be stored in a "portable physical medium", such as an FD, a CD-ROM, a DVD disk, an magneto-optical disk, or an IC card. The computer 100 may acquire each program from the portable physical medium and execute the program. Alternatively, each program may be stored in another computer, or a server device, connected to the computer 100 via a public line, the Internet, a LAN, or a WAN and the computer 100 may acquire each program from the computer or the server device and execute the program.

It is possible to improve the accuracy of authentication.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer readable recording medium having stored therein an image processing program that causes an information terminal to execute a process comprising:
    acquiring an image of a first subject that is captured by a first sensor provided on a back surface of a surface on which a screen of the information terminal is disposed; and
    when displaying the image on the screen, changing a degree of scaling up/down of the image and a position at which the image is displayed in accordance with a position of a second subject that is imaged by a second sensor provided to the information terminal in order that the image of the first subject is superimposed onto a real first subject exposed over the screen.

2. The computer readable recording medium according to claim 1, wherein the process further comprises:
    by using a distance sensor that measures a distance, measuring a distance between the information terminal and the second subject; and
    detecting the position of the second subject from the distance between the information terminal and the second subject.

3. The computer readable recording medium according to claim 1, wherein the process further comprises:
    by using a distance between characteristic points of a face acquired from an image of a face of a user of the information terminal captured by the second sensor, estimating a distance between the information terminal and the face of the user of the information terminal; and
    estimating the position of the second subject from the distance between the information terminal and the face of the user of the information terminal.

4. The computer readable recording medium according to claim 1, wherein the process further comprises:
    by using a size of the living body of a user of the information terminal acquired from the image captured by the first sensor, estimating a distance between the information terminal and a face of the user of the information terminal; and
    estimating the position of the second subject from the distance between the information terminal and the face of the user of the information terminal.

5. An image processing method comprising:
    acquiring, by a processor, an image of a first subject that is captured by a first sensor provided on a back surface of a surface on which a screen of the information terminal is disposed; and
    when displaying the image on the screen, changing, by the processor, a degree of scaling up/down of the image and a position at which the image is displayed in accordance with a position of a second subject that is imaged by a second sensor provided to the information terminal in order that the image of the first subject is superimposed onto a real first subject exposed over the screen.

6. The image processing method according to claim 5, further comprising:
by using a distance sensor that measures a distance, measuring, by the processor, a distance between the information terminal and the second subject; and
detecting, by the processor, the position of the second subject from the distance between the information terminal and the second subject.

7. The image processing method according to claim 5, further comprising:
by using a distance between characteristic points of a face acquired from an image of a face of a user of the information terminal captured by the second sensor, estimating, by the processor, a distance between the information terminal and the face of the user of the information terminal; and
estimating, by the processor, the position of the second subject from the distance between the information terminal and the face of the user of the information terminal.

8. The image processing method according to claim 5, further comprising:
by using a size of the living body of a user of the information terminal acquired from the image captured by the first sensor, estimating, by the processor, a distance between the information terminal and a face of the user of the information terminal; and
estimating, by the processor, the position of the second subject from the distance between the information terminal and the face of the user of the information terminal.

9. An information terminal comprising:
a processor that executes a process comprising:
acquiring an image of a first subject that is captured by a first sensor provided on a back surface of a surface on which a screen of the information terminal is disposed; and
when displaying the image on the screen, changing a degree of scaling up/down of the image and a position at which the image is displayed in accordance with a position of a second subject that is imaged by a second sensor provided to the information terminal in order that the image of the first subject is superimposed onto a real first subject exposed over the screen.

10. The information terminal according to claim 9, the process further comprises:
by using a distance sensor that measures a distance, measuring a distance between the information terminal and the second subject; and
detecting the position of the second subject from the distance between the information terminal and the second subject.

11. The information terminal according to claim 9, the process further comprises:
by using a distance between characteristic points of a face acquired from an image of a face of a user of the information terminal captured by the second sensor, estimating a distance between the information terminal and the face of the user of the information terminal; and
estimating the position of the second subject from the distance between the information terminal and the face of the user of the information terminal.

12. The information terminal according to claim 9, the process further comprises:
by using a size of the living body of a user of the information terminal acquired from the image captured by the first sensor, estimating a distance between the information terminal and a face of the user of the information terminal; and
estimating the position of the second subject from the distance between the information terminal and the face of the user of the information terminal.

* * * * *